US011187093B2

(12) United States Patent
Trivedi et al.

(10) Patent No.: US 11,187,093 B2
(45) Date of Patent: Nov. 30, 2021

(54) FACE SEAL ASSEMBLY WITH THERMAL MANAGEMENT CIRCUIT AND AN ASSOCIATED METHOD THEREOF

(71) Applicant: General Electric Company, Schenectady, NY (US)

(72) Inventors: Deepak Trivedi, Halfmoon, NY (US); Uttara Vijay Kumar, Glenville, NY (US); Rahul Anil Bidkar, Niskayuna, NY (US)

(73) Assignees: GENERAL ELECTRIC COMPANY, Schenectady, NY (US); UNITED STATES DEPARTMENT OF ENERGY, Washington, DC (US)

( * ) Notice: Subject to any disclaimer, the term of this patent is extended or adjusted under 35 U.S.C. 154(b) by 171 days.

(21) Appl. No.: 16/369,673

(22) Filed: Mar. 29, 2019

(65) Prior Publication Data
US 2020/0308971 A1    Oct. 1, 2020

(51) Int. Cl.
*F01D 11/00*    (2006.01)
*F01D 11/08*    (2006.01)

(52) U.S. Cl.
CPC .......... *F01D 11/001* (2013.01); *F01D 11/003* (2013.01); *F01D 11/08* (2013.01)

(58) Field of Classification Search
CPC ...... F01D 11/001; F01D 11/003; F01D 11/08; F16J 15/34; F16J 15/3404; F16J 15/3408; F16J 15/3416; F16J 15/342; F16J 15/3492
See application file for complete search history.

(56) References Cited

U.S. PATENT DOCUMENTS

| 3,804,424 A | 4/1974 | Gardner |
| 4,365,815 A | 12/1982 | Scott |
| 4,523,764 A * | 6/1985 | Albers .................. F16J 15/406 277/400 |
| 4,961,678 A * | 10/1990 | Janocko ................ F16J 15/406 415/170.1 |
| 5,593,165 A | 1/1997 | Murray et al. |

(Continued)

OTHER PUBLICATIONS

Munson et al., "Development of Film Riding Face Seals for a Gas Turbine Engine", Tribology Transactions, vol. 35, Issue: 01, pp. 65-70, 1992.

(Continued)

*Primary Examiner* — Gilbert Y Lee
(74) *Attorney, Agent, or Firm* — Dority & Manning, P.A.

(57) ABSTRACT

A face seal assembly including a thermal fluid circuit, a turbomachine including the face seal assembly and a method of operating the turbomachine are disclosed. The face seal assembly includes a seal ring including a seal bearing face, at least one internal cavity including a cavity inlet and a cavity outlet. The face seal assembly further including a fluid inlet channel in fluid communication with the cavity inlet of the at least one internal cavity and a pressurized fluid and a fluid outlet port in fluid communication with the cavity outlet of the at least one internal cavity. The at least one internal cavity, the fluid inlet channel and the fluid outlet port define a thermal fluid circuit providing thermal management of the seal ring. In the turbomachine, the face seal assembly is disposed between a stationary component and a rotating component including a rotating component bearing face.

23 Claims, 8 Drawing Sheets

(56) References Cited

U.S. PATENT DOCUMENTS

| | | | |
|---|---|---|---|
| 5,626,347 A | 5/1997 | Ullah | |
| 6,149,160 A | 11/2000 | Stephens et al. | |
| 6,969,236 B2 | 11/2005 | Giesler et al. | |
| 7,252,291 B2 | 8/2007 | Khonsari et al. | |
| 8,888,104 B2 * | 11/2014 | Garrison | F16J 15/3412 |
| | | | 277/306 |
| 2002/0079648 A1 * | 6/2002 | Uth | F16J 15/406 |
| | | | 277/401 |
| 2006/0207834 A1 | 9/2006 | Giesler et al. | |
| 2014/0286599 A1 | 9/2014 | Devitt et al. | |

OTHER PUBLICATIONS

Tibos et al., "Investigation of Effective Groove Types for a Film Riding Seal", Journal of Engineering for Gas Turbines and Power, vol. 139, Issue: 07, pp. 1-8, Feb. 14, 2017.

* cited by examiner

FACE SEAL ASSEMBLY WITH THERMAL MANAGEMENT CIRCUIT AND AN ASSOCIATED METHOD THEREOF

This disclosure was made with Government support under contract number DE-FE0024007 awarded by U.S. Department of Energy. The Government has certain rights in the disclosure.

BACKGROUND

The present disclosure relates generally to a turbomachine, and, more particularly, to a face seal assembly including a thermal management circuit and a method of operating such a face seal assembly in the turbomachine.

Turbomachines generally include compressors, turbines, and a rotating component, such as, a shaft or a drum, which support turbomachine blades. For example, the turbomachine blades may be arranged in stages along the rotating component. The turbomachine may further include various seals to reduce a leakage flow of a process fluid between various components of the turbomachine. For example, the turbomachine may include a face seal assembly, also referred to as a film riding seal assembly, configured to reduce the leakage flow of the process fluid from a high-pressure cavity to a low-pressure cavity. Typically, such a face seal assembly may include a sealing ring slidably coupled to the housing and disposed proximate to a rotating component. During stationary condition, such as, zero speed or low-speed operating condition, sealing faces of both the sealing ring and the rotating component are in contact with each other. While, during normal operating conditions, a fluid-film of a pressurized fluid may separate the sealing faces from each other and prevent wear due to friction. The fluid-film may further reduce the leakage flow of the process fluid there between the sealing faces.

The face seal assembly, for example, a hydrodynamic or hydrostatic face seal assembly, typically operates with a thin fluid-film (i.e., about 2 microns to about 10 microns). The sealing faces for such a face seal assembly need to have a high degree of flatness, tight assembly tolerance, and small thermal deformation for operating with the thin fluid-film. These requirements of the sealing faces may become further difficult to maintain with increasing diameter of the sealing ring and the rotating component. Of specific concern herein is thermal distortion of the seal, which limits the use of the seal at high temperatures, high speeds, large diameters and small gaps. Of particular concern is the resulting deformation or coning, either inwardly or outwardly, of the seal due to thermal loads and/or pressure loads.

Accordingly, there is a need for an enhanced face seal assembly for a turbomachine and an associated method for operating such a face seal assembly that provides thermal management of the seal to reduce temperature gradients in the seal, thereby reducing the thermal distortion (coning) of the seal, deformations of the sealing faces, and angular misalignment with the rotating component.

BRIEF DESCRIPTION

Aspects and advantages of the disclosure are set forth below in the following description, or may be obvious from the description, or may be learned through practice of the disclosure.

In accordance with one embodiment, a face seal assembly is disclosed. In accordance with aspects of the present disclosure, the face seal assembly includes a seal ring comprising a seal bearing face, at least one internal cavity including a cavity inlet and a cavity outlet, a fluid inlet channel in fluid communication with the cavity inlet of the at least one internal cavity and a pressurized fluid and a fluid outlet port in fluid communication with the cavity outlet of the at least one internal cavity. The at least one internal cavity, the fluid inlet channel and the fluid outlet port define a thermal fluid circuit providing thermal management of the seal ring.

In accordance with another embodiment, a face seal assembly is disclosed. In accordance with aspects of the present disclosure, the face seal assembly includes a seal ring comprising a seal bearing face, a first internal cavity including a cavity inlet and a cavity outlet, at least one additional internal cavity including a cavity inlet and a cavity outlet, a fluid channel extending from the first internal cavity to the at least one additional internal cavity, a fluid inlet channel in fluid communication with a pressurized fluid and the cavity inlet of one of the first internal cavity and the at least one additional internal cavity and a fluid outlet port in fluid communication with the cavity outlet of the other of the first internal cavity and at least one additional internal cavity. The first internal cavity, the at least one additional internal cavity and the fluid channel define a fluid circuit providing thermal management of the seal ring.

In accordance with another embodiment, a turbomachine is disclosed. In accordance with aspects of the present disclosure, the turbomachine includes a stationary component, a rotating component comprising a rotating component bearing face and a face seal assembly. The face seal assembly comprising a seal ring comprising a seal bearing face, at least one internal cavity including a cavity inlet and a cavity outlet, a fluid inlet channel in fluid communication with the cavity inlet of the at least one internal cavity and a pressurized fluid and a fluid outlet port in fluid communication with the cavity outlet of the at least one internal cavity. The at least one internal cavity, the fluid inlet channel and the fluid outlet port define a thermal fluid circuit providing thermal management of the seal ring. The turbomachine further comprising a first pressure cavity and a second pressure cavity defined by the stationary component, the rotating component, and the face seal assembly.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

DRAWINGS

These and other features and aspects of embodiments of the present disclosure will become better understood when the following detailed description is read with reference to the accompanying drawings in which corresponding reference characters indicate corresponding parts throughout the several views of the drawings.

DETAILED DESCRIPTION

Figure 1:
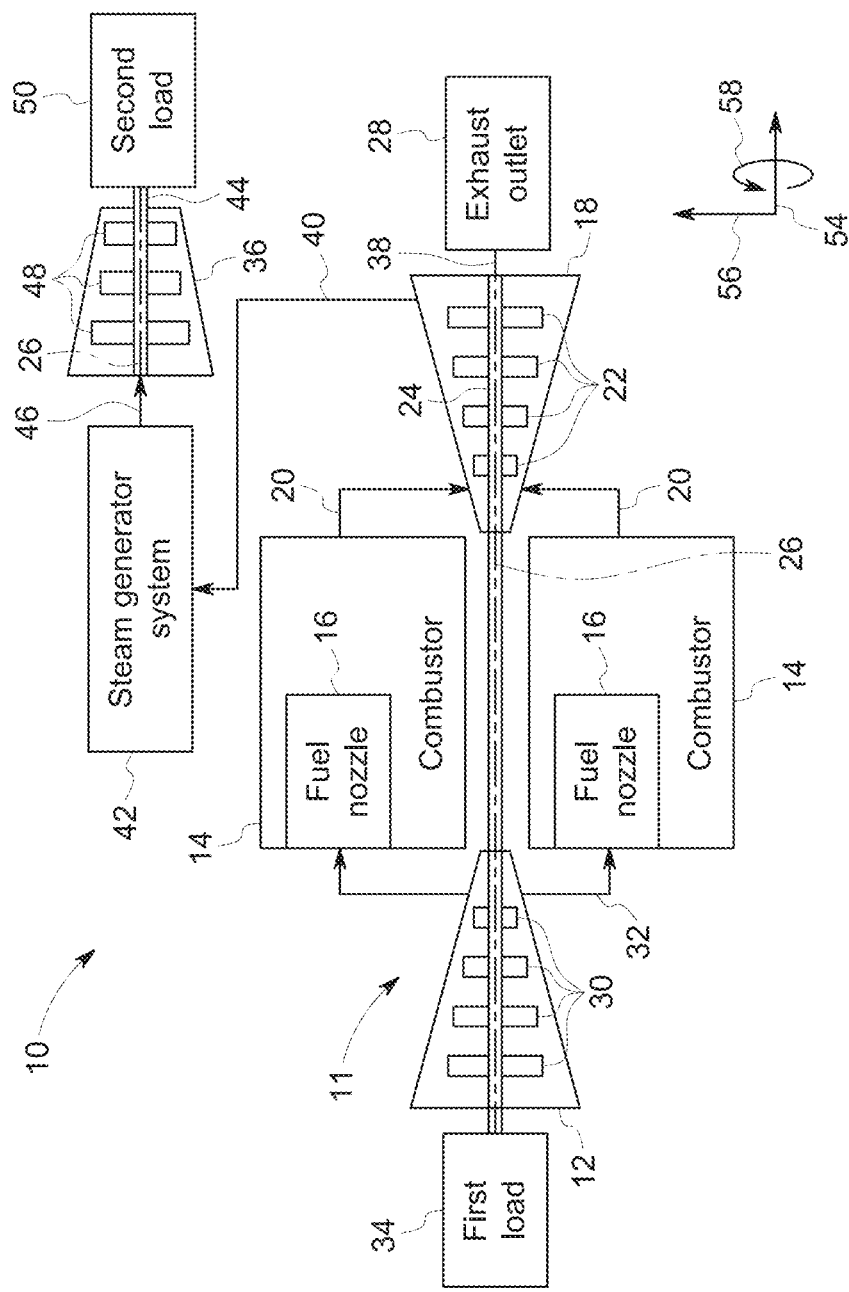
FIG. 1 is a schematic diagram of an embodiment of a combined cycle power generation system having a gas turbine system, a steam generator system, and a steam turbine, in accordance with one or more embodiments of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments discussed herein disclose a face seal assembly for a turbomachine, such as, but not limited to, a gas turbine, a steam turbine, a supercritical carbon dioxide turbine, a turbo compressor, and a hydro turbine. In some other embodiments, the face seal assembly may be used in a large-scale $CO_2$ production system, a compressor, an aircraft engine, and the like. In certain embodiments, the turbomachine includes a stationary component, a rotating component, and the face seal assembly disposed between a portion of the stationary component and the rotating component. The rotating component includes a rotating component bearing face. In one embodiment, the face seal assembly includes a seal ring including a seal bearing face, a first internal cavity, a second internal cavity, a fluid channel fluidically coupling the first internal cavity and the second internal cavity and a plurality of isolated hydrostatic ports extending from the first internal cavity to the seal bearing face. The first internal cavity, the second internal cavity, the fluid channel and the plurality of isolated hydrostatic ports defining a thermal management circuit, also referred to herein as a thermal hydrostatic fluid circuit.

The face seal assembly is coupled to the stationary component and defines a face seal clearance between the rotating component bearing face and the seal bearing face. The terms "face seal clearance" and "rotating component-stationary component gap" may be used interchangeably. The turbomachine further includes at least one internal cavity. In an embodiment, the turbomachine includes a first pressure cavity and a second pressure cavity defined by the stationary component, the rotating component, and the face seal assembly. The second pressure cavity is disposed downstream of the first pressure cavity with reference to a flow of a process fluid along the stationary component and the rotating component.

During operation of the face seal assembly, the rotating component may start rotating by a rubbing contact with the seal ring. This may be because at zero speed (i.e., stationary conditions) or low speeds, the rotating component may not generate enough separating forces to lift-off the seal bearing face. In such conditions, the plurality of isolated hydrostatic ports may be used to lift-off the seal bearing face. For example, at zero speed condition, the isolated hydrostatic ports may inject the pressurized fluid against the rotating component bearing face to generate the separating force which is adequate to lift-off the seal bearing face. Thereby, the pressurized fluid produces a thin fluid-film there between the rotating component bearing face and the seal bearing face. The rotating component may then spin and the sealing faces of the rotating component and the seal ring may not get damaged by start-up rubs.

The face seal assembly of the present disclosure includes a thermal management circuit, or thermal hydrostatic fluid circuit that provides cooling of an interior of the face seal assembly. More particularly, the thermal hydrostatic fluid circuit utilizes the fluid that traverses through the internal cavities to effectively to reduce temperature gradients in the face seal assembly, thereby reducing the thermal distortion (coning) on the seal. The thermal hydrostatic fluid circuit is optimized to provide more cooling in regions where the high temperatures are expected during operation. Therefore, the temperature gradients within the face seal assembly are minimized, and thermal distortion is reduced.

The face seal assembly is further configured to reduce leakage of a process fluid from a high-pressure cavity, also referred to herein as the first pressure cavity, to a low-pressure cavity, also referred to herein as the second pressure cavity. In certain embodiments, the first pressure cavity may be referred as a "seal upstream cavity" and the second pressure cavity as a "seal downstream cavity".

The face seal assembly of the present disclosure is configured to operate with the seal bearing face and/or the rotating component bearing face having a relatively low degree of flatness, thereby reducing the cost of machining sealing faces of the seal ring and the rotating component. It should be noted herein that the term "low degree of flatness" may refer to a flatness of the seal bearing face and/or the rotating component bearing face in a range from about 3 microns to about 10 microns. Further, the turbomachines may be allowed to use a large diameter seal ring and/or rotating component having the low degree of flatness in the face seal assembly. It should be noted herein the term a "large diameter" may refer to the diameter of the seal ring and/or the rotating component which is greater than 0.5 meters.

FIG. 1 is a schematic diagram of an embodiment of a combined cycle system 10 in accordance with one exemplary embodiment of the present disclosure. The combined cycle system 10 includes various turbomachines in which a face seal assembly (not shown) of the present disclosure may be used. Specifically, such turbomachines may include a face seal assembly as disclosed herein. In certain embodiments, the face seal assembly includes a seal bearing face and a thermal management circuit, or thermal hydrostatic fluid circuit.

As illustrated in the embodiment of FIG. 1, the combined cycle system 10 includes turbomachines, such as, a compressor 12 and a gas turbine 18 of a gas turbine system 11. In such embodiments, the gas turbine system 11 further includes combustors 14 having fuel nozzles 16, coupled to the compressor 12 and the gas turbine 18. In the illustrated embodiment, the compressor 12 includes compressor blades 30 which are coupled to a rotating component 24. The compressor blades 30 are driven by the rotating component 24 of the gas turbine 18, thereby compressing air to generate a pressurized air 32 and further routing the pressurized air 32 to the combustors 14. In certain embodiments, the compressor 12 may include a face seal assembly (not shown), which is configured to regulate an undesired leakage of the pressurized air 32 across a rotating component-stationary component gap (i.e., a face seal clearance) defined within the compressor 12. The fuel nozzles 16 inject a liquid fuel and/or gas fuel, such as natural gas or syngas, into the combustors 14, where such a fuel is mixed with the pressurized air 32 to generate a fuel-air mixture. The combustors 14 ignite and combust the fuel-air mixture, and then route an exhaust gas 20 to the gas turbine 18 having turbine blades 22, which are coupled to the rotating component 24. As illustrated, the rotating component 24 is also coupled to the compressor 12. As the exhaust gas 20 flows through the turbine blades 22, the rotating component 24 is rotated along a central line axis 26 of the combined cycle system 10. In certain embodiments, the gas turbine 18 may also include the face seal assembly, which is configured to regulate an undesired leakage of the exhaust gas 20 across a face seal clearance (not shown) defined within the gas turbine 18. The rotating component 24 is also coupled to a first load 34 to generate power. The first load 34 may include an electrical generator, a propeller of an airplane, and the like.

The combined cycle system 10 further includes turbomachines, such as, a steam turbine 36. In the illustrated embodiment, the gas turbine 18 is coupled to an exhaust outlet 28 and a steam generator system 42 which is coupled to the steam turbine 36. A portion 38 of the exhaust gas 20 exits the gas turbine 18 via the exhaust outlet 28. Another portion 40 of the exhaust gas 20 is transported from the gas turbine 18 to the steam generator system 42 to heat water and produce steam 46. The steam 46 produced by the steam generator system 42 flows through turbine blades 48 of the steam turbine 36. As the steam 46 flow through the turbine blades 48, a rotating component 44 is rotated, thereby powering a second load 50, such as, an electrical generator. In certain embodiments, the steam turbine 36 may also include a face seal assembly (not shown), which is configured to regulate an undesired leakage of steam 46 across a face seal clearance defined within the steam turbine 36.

In the following discussion, reference is made to various directions or axes, such as, an axial direction 54 along the central line axis 26, a radial direction 56 away from the central line axis 26, and a circumferential direction 58 around the central line axis 26 of the turbomachines, such as, compressor 12, the gas turbine 18, the steam turbine 36. Additionally, as mentioned above, while the face seal assembly described hereinafter may be used with a variety of other turbomachines (e.g., supercritical $CO_2$ turbines, aircraft engines, and the like) the following discussion describes an enhanced face seal assembly in the context of the steam turbine 36 and such an embodiment should not be construed as a limitation of the present disclosure.

Figure 2:
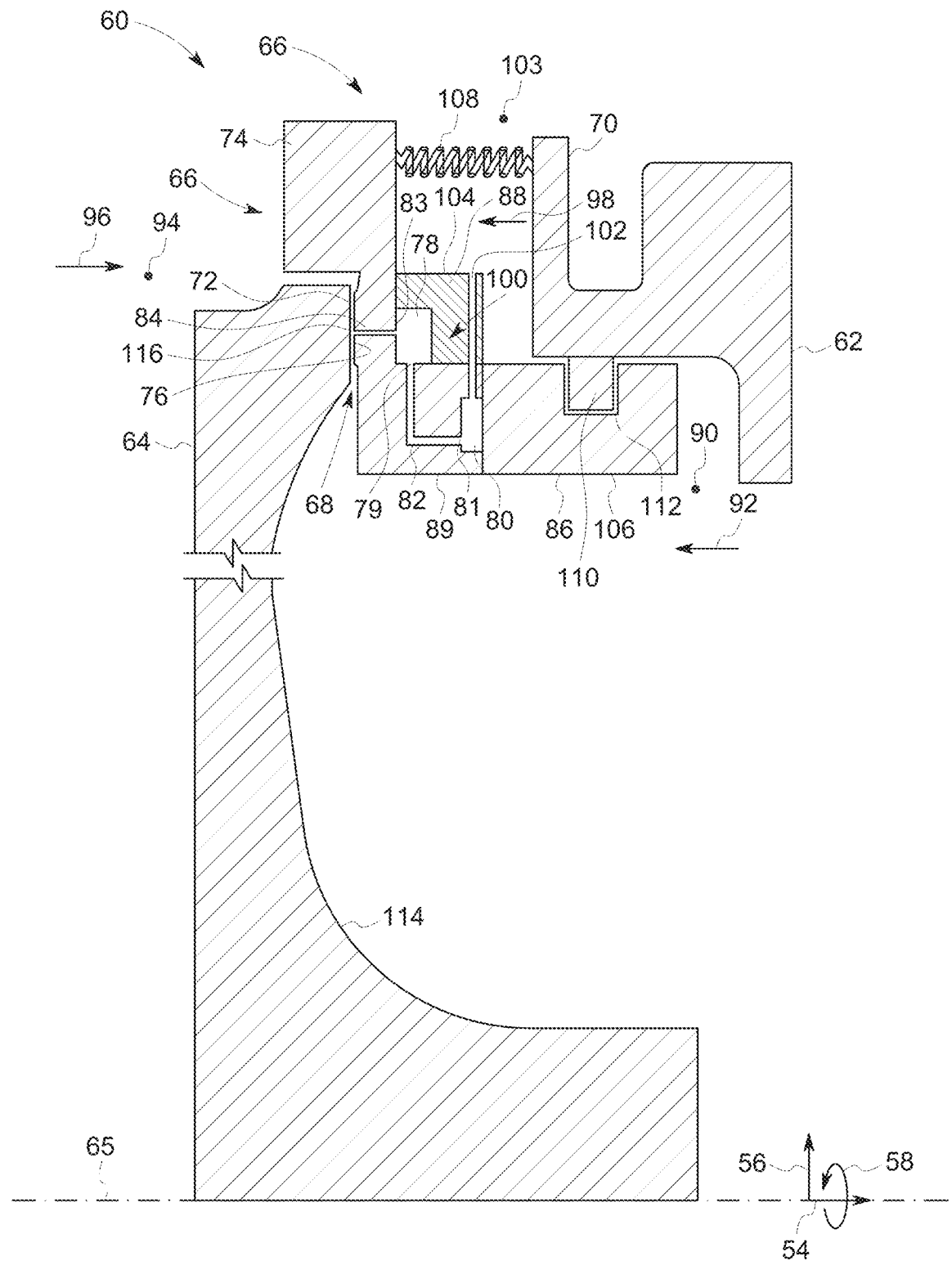
FIG. 2 is a schematic sectional view of a portion of a turbomachine including a stationary component, a rotating component, and a face seal assembly, in accordance with one or more embodiments of the present disclosure.
Figure 3:
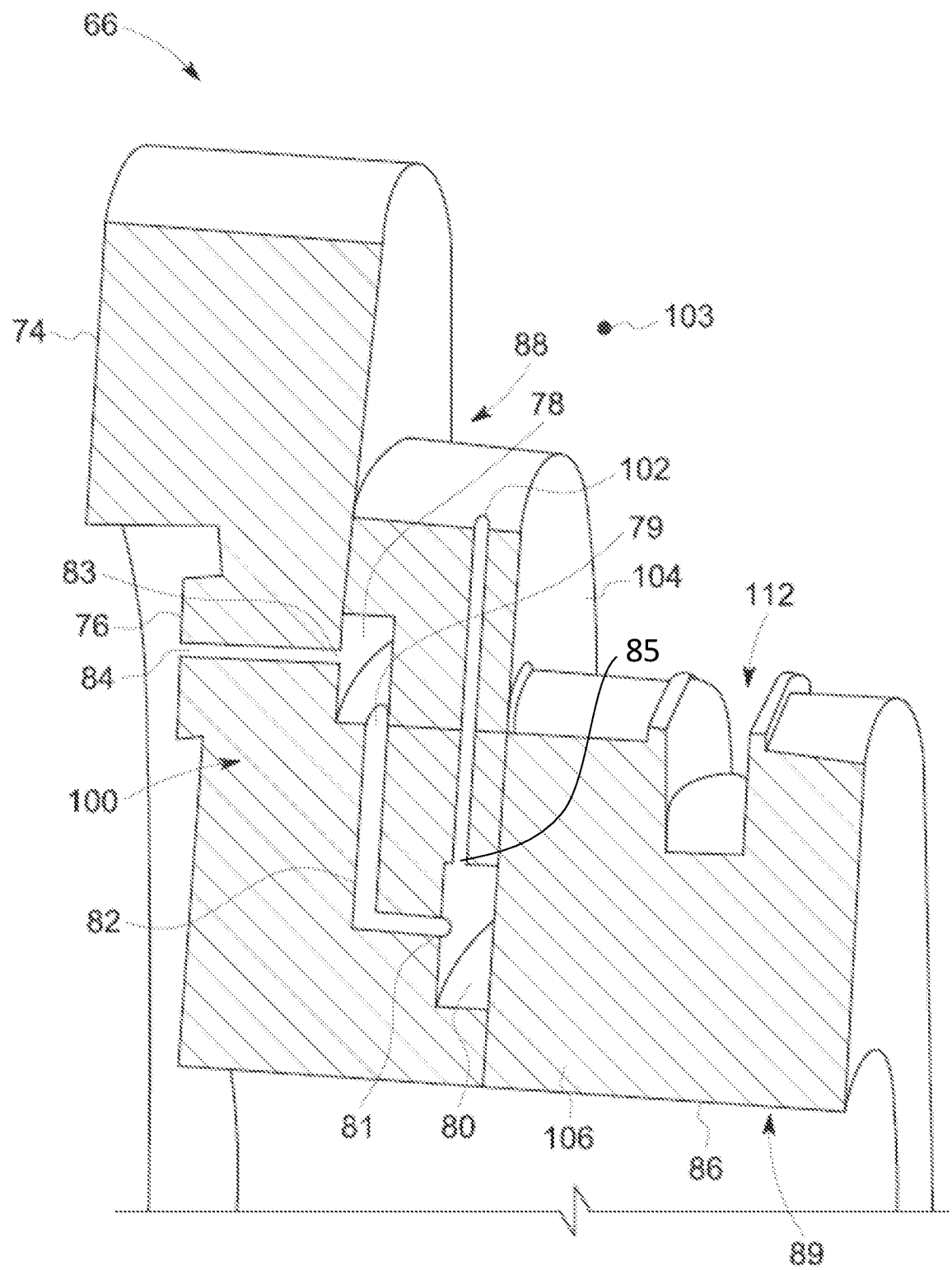
FIG. 3 is a schematic isometric sectional view of a face seal assembly, in accordance with one or more embodiments of the present disclosure.

Referring now to FIGS. 2 and 3, FIG. 2 illustrates in a schematic sectional view a portion of a rotary machine 60, such as steam turbine 36 of FIG. 1, in accordance with one exemplary embodiment of the present disclosure. More specifically, FIG. 2 illustrates a cross-sectional view of one embodiment of a face seal assembly described presently. FIG. 3 illustrates in schematic isometric view the face seal assembly of FIG. 2. The rotary machine 60 includes a stationary, or non-rotating component 62, such as a stator, a rotating component 64, such as a rotor and a face seal assembly 66. The face seal assembly forms a fluid seal between the rotating component 64 and the stationary component 62. The stationary component 62 and the rotating component 64 are schematically shown in FIG. 2 and may have another shape or appearance from what is shown. Only part of the stationary component 62 and part of the rotating component 64 are visible in FIGS. 2 and 3. The rotating component 64 rotates about or around an axis of rotation 65, which also can be referred to as a center line of the rotary machine. In the cross-sectional drawing of FIG. 2, the rotating component 64 rotates in and out of the plane of the page along a rotational or circumferential direction 58. The components shown in the cross-sectional views herein may extend entirely around the axis of rotation 65 or may be a curved segment of several segments that, when combined, extend entirely around the axis of rotation 65.

In one embodiment, the stationary component 62 is a casing of the rotary machine 60 and the rotating component 64 is a shaft of the rotary machine 60. The face seal assembly 66 is disposed between the stationary component 62 and the rotating component 64 such that a face seal clearance 68 (hereinafter also referred to as a "primary seal clearance") is established between the face seal assembly 66 and the rotating component 64. In one embodiment, the portion corresponds to an end packing area of the rotary machine 60. As used herein, the term "end packing" refers to a downstream end of the rotating component 64, where the face seal assembly 66 acts as an interface between the rotating component 64 and the stationary component 62. In such an embodiment, the rotating component 64 includes a rotating component bearing face 72 extending circumferentially.

The rotary machine 60 further includes a stationary component adaptor 70 coupled to the stationary component 62. In certain embodiments, the stationary component adaptor 70 extends along the circumferential direction 58 of the rotary machine 60. In the illustrated embodiment, the stationary component adaptor 70 has a generally L-shaped profile. The stationary component 62 extends along the axial direction 54.

In the illustrated embodiment, the face seal assembly 66 includes a seal ring 74. The seal ring 74 includes a seal bearing face 76 which faces the rotating component 64. The seal bearing face 76 is located on a side of the seal ring 74 that is opposite of the side of the seal ring 74 that faces the stationary component 62. The seal bearing face 76 can be in the shape of a ring or a segment of a ring that encircles the axis of rotation 65. The seal ring 74 further includes at least one internal cavity formed therein. In the embodiment of FIGS. 2 and 3, the seal ring 74 includes a first internal cavity 78, a second internal cavity 80, a fluid channel 82 extending from an outlet 81 of the second internal cavity 80 to an inlet 79 of the first internal cavity 78 and a plurality of isolated hydrostatic ports 84 (only one isolated hydrostatic port 84 is shown in FIG. 2) extending from an outlet 83 of the first internal cavity 78 to the seal bearing face 76. In combination, the first internal cavity 78, the second internal cavity 80 and the fluid channel 82 form a hydrostatic fluid circuit 100. It is noted in the illustrated embodiment, while two cavities 78, 80 are illustrated, the face seal assembly 66, and more particularly the number of cavities included within the hydrostatic fluid circuit 100 may be optimized to provide desired cooling of the face seal assembly 66.

It should be noted herein that FIGS. 2-5 illustrate only a portion of the seal ring 74. In the illustrated embodiments, the seal ring 74 has a generally L-shaped profile having a projected end portion 86 extending away from the seal bearing face 76. Referring again to FIGS. 2 and 3, the first internal cavity 78 is disposed within the seal ring 74 and located proximate to a first peripheral side 88 of the seal ring 74. The second internal cavity 80 is disposed within the seal ring 74 and located proximate to a second peripheral side 89 of the seal ring 74. Each of the plurality of isolated hydrostatic ports 84 extends from the first internal cavity 78 to a corresponding opening (not shown) of the isolated hydrostatic port 88 formed on the seal bearing face 76. In some embodiments, one of the seal bearing face 76 and the rotating component bearing face 72 may include a plurality of hydrodynamic elements (not shown) disposed along the circumferential direction 58.

The rotary machine 60 includes a first pressure cavity, and more particularly, a higher pressure side or volume, 94 having a flow of a process fluid 96 at a high-pressure and a second pressure cavity, and more particularly, a lower pressure side or volume, 90 having a flow of a mixed fluid 92 at a low-pressure. In certain embodiments, the process fluid 96 is a mixture of the mixed fluid 92 and a pressurized fluid 98 that flows through the thermal hydrostatic fluid circuit 100. The higher pressure volume 94 and the lower pressure volume 90 are defined by the stationary component 62, the rotating component 64 and the face seal assembly 66. It should be noted herein that the higher pressure volume 94 and the lower pressure volume 90 may also be referred to as a "seal upstream cavity" and a "seal downstream cavity", respectively. In certain embodiments, the higher pressure volume 94 is disposed downstream of the lower pressure volume 90 with reference to the flow of the process fluid 92 along the stationary component 62 and the rotating component 64.

In the illustrated embodiment, the rotary machine 60 further includes a fluid inlet port 101 in fluid communication, via an inlet channel 102, with the pressurized fluid 98 and an inlet 85 of the second internal cavity 80. The inlet channel 103 extends from a radially outer surface of a weld cover (described presently) to the second internal cavity 80, and more particularly, from a higher fluid pressure side or volume 103 and the flow of the pressurized fluid 98. In an embodiment, a fluid source 99 is disposed outside the rotary machine 60. In one embodiment, the inlet channel 102 may be coupled to the fluid source 99, such as a storage tank of the pressurized fluid 98, configured to supply the pressurized fluid 98 to the second internal cavity 80 through the inlet channel 102. In an embodiment, the pressurized fluid 98 may be air. In some other embodiments, the pressurized fluid 98 may be $CO_2$, nitrogen, steam and the like. In certain embodiments, the inlet channel 102 may be coupled to either the first internal cavity 78, the second internal cavity 80 and/or at least one stage of a plurality of stages of the turbomachine, for example, the compressor 12 or the gas turbine 18 (as shown in FIG. 1). In such an embodiment, the at least one stage may be a downstream stage of the compressor 12 or an upstream stage of the gas turbine 18. The at least one stage of the turbomachine may be configured to supply the pressurized fluid 98 (or pressurized exhaust gas) directly to the first internal cavity 78 or the second internal cavity 80 through the inlet channel 102.

In one embodiment, the face seal assembly 66 further includes a first weld cover 104 and a second weld cover 106. During fabrication of the face seal assembly 66, the first internal cavity 78 is defined in the seal ring 74 by the first weld cover 104. More particularly, the first weld cover 104 is positioned relative to the seal ring 74 to define the first internal cavity 78 therebetween. Similarly, during fabrication, the second internal cavity 80 is defined in the seal ring 74 by the second weld cover 106. In an embodiment, the first internal cavity 78 and the second internal cavity 80 may be formed using well-known techniques, such as additive manufacturing or conventional manufacturing and joining techniques.

In one embodiment, the face seal assembly 66 is operatively coupled to the stationary component 62 via a plurality of biasing members 108 and defines the face seal clearance 68 between the rotating component bearing face 72 and the seal bearing face 76. Specifically, the seal ring 74 is slidably coupled to the stationary component adaptor 70. In certain embodiments, the plurality of biasing members 108 is configured to move the face seal assembly 66 along an axial direction 54 of the rotary machine 60. In an embodiment, such an axial movement of the face seal assembly 66 is restricted by a piston ring 110 and cooperating piston groove 112 coupled to the stationary component 62 and an end portion 86 of the seal ring 74. In the illustrated embodiment, the plurality of biasing members 108 includes helical springs. In certain embodiments, the plurality of biasing members 108 is configured to apply a closing force on the seal ring 74 to move the seal ring 74 along the axial direction 54 and contact the rotating component 64. In one or more embodiments, the seal bearing face 76 and the rotating component bearing face 72 are in contact with each other during a stationary condition of the rotating component 42.

The piston ring 110 may be disposed between the stationary component 62 and the seal ring 74. The piston ring 110 can be a resilient ring-shaped body that encircles the seal ring 74 and engages with the piston groove 112. The piston ring 110 provides a secondary seal within the face seal assembly 66 to prevent or reduce leakage of fluid from the higher-pressure side or volume 90 to the lower pressure side or volume 94 (relative to a seal assembly not having the piston ring 110). An axially elongated oil deflector 114 of the rotating component 64 can extend in the axial direction 54. The oil deflector 114 also can extend between part of the seal ring 74 and an axis of rotation 65 along the radial direction 56. Alternatively, the rotating component 44 may not include the axially elongated oil deflector 114.

The face seal assembly 66 is configured to regulate a leakage flow of the process fluid 92 from the high pressure cavity 94 to the low pressure cavity 90 through the face seal clearance 68, using a fluid film 116 formed in the face seal clearance 68. In one embodiment, the process fluid 92 may be steam. In some other embodiments, the process fluid 92 may be $CO_2$ and the like.

In operation, an increased fluid pressure is formed on the higher-pressure side or volume 94 of the seal assembly 66 than on the lower pressure side 90 of the seal assembly 66. The plurality of biasing members 108 pull the seal ring 74 in the axial direction 54 and away from the rotating component 64. Fluid pressure from the side or volume 94 can urge or force the seal ring 74 toward the rotating component 64 (e.g., in a direction opposite the axial direction 54 and opposite to the direction in which the plurality of biasing members 108 pull the seal ring 74).

As the seal ring 74 moves toward the rotating component 64, this movement reduces the space through which fluid can move from the higher-pressure side or volume 90 to the lower pressure side or volume 94. The seal ring 74 continues to move toward the rotating component 64 until the sealing surface 76 of the seal ring 74 contacts the rotor face 72. This seal can prevent or reduce leakage of fluid from the higher-pressure side 94 to the lower pressure side 90 between the seal ring 74 and the rotating component 64.

During operation, some of the pressurized fluid 98 moves through the inlet channel 102 to the second internal cavity 80 and then the first internal cavity 78. A portion of this fluid forms the axial fluid film bearing 116 between the seal bearing face 76 and the rotating component 64. An axial thickness of this film bearing 116 is shown in an exaggerated size in FIG. 2. The axial thickness may be on the order of three to six mils, in one embodiment. Alternatively, the thickness may be smaller than three mils or larger than six mils. The fluid pressure on opposite sides of the seal assembly 66 drops from a higher pressure (referred to as $P_{high}$ herein) to a lower pressure (referred to as $P_{low}$ herein) across the interface of the seal bearing surface 76 and the rotor face 72.

In addition, a portion of the pressurized fluid 98 moves from the second internal cavity 80 to the first internal cavity 78 via the fluid channel 82 and provides cooling to the seal assembly 66. The movement of the pressurized fluid 98 through the seal assembly 66 and more particularly via the thermal cavities 78, 80 provides a thermal management circuit to the seal assembly 66.

Figure 4:
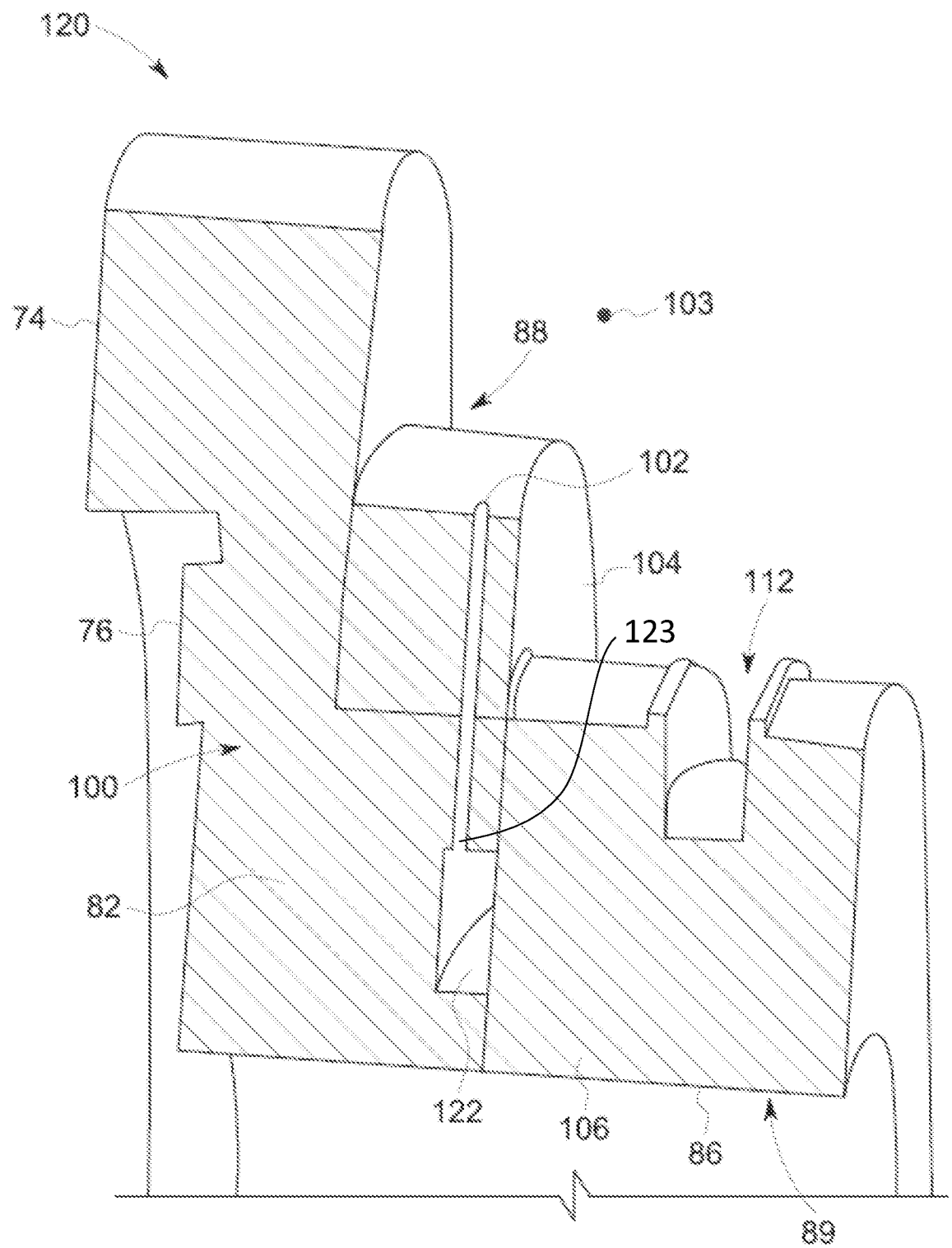
FIG. 4 is a schematic isometric sectional view of another embodiment of a face seal assembly, in accordance with one or more embodiments of the present disclosure.

Referring briefly to FIG. 4, illustrated is another embodiment of a seal assembly, generally referenced 120. It should be noted that corresponding reference characters indicate corresponding parts to those of FIGS. 2 and 3. In the embodiment of FIG. 4, it is noted the seal ring 74 includes a single internal cavity 122. The single internal cavity 122, as illustrated, is located proximate to a second peripheral side 89 of the seal ring 74. The location of the internal cavity 122 may be optimized to provide more cooling in regions where high temperatures are expected, and thereby decreasing thermal distortion of the seal. In an alternate embodiment, the single internal cavity may be located proximate to a first peripheral side 88. In the illustrated embodiment, the rotary machine 60 further includes an inlet channel 102 in fluid communication with the pressurized fluid 98 and an inlet 123 of the single internal cavity 122. The inlet channel 102 extends from a radially outer surface of a first weld cover 104 to the single internal cavity 122, and more particularly, from a higher fluid pressure side or volume 103 and the flow of the pressurized fluid 98. The single internal cavity 122 includes an outlet (not shown) and cooperating port (not shown) disposed circumferential about the first weld cover 104. The outlet of the single internal cavity 122 and port are spaced a distance from the inlet 102. In an embodiment, the inlet 102 radially is positioned at a 12'oclock position, and an outlet and port of the single internal cavity 122 are positioned at a 6'oclock position.

Similar to the cavity location, the inlet 102 and outlet of the internal cavity 122 may be optimized according to desired outcomes. The single internal cavity outlet would provide routing of the hot fluid out of the seal ring 74.

Figure 5:
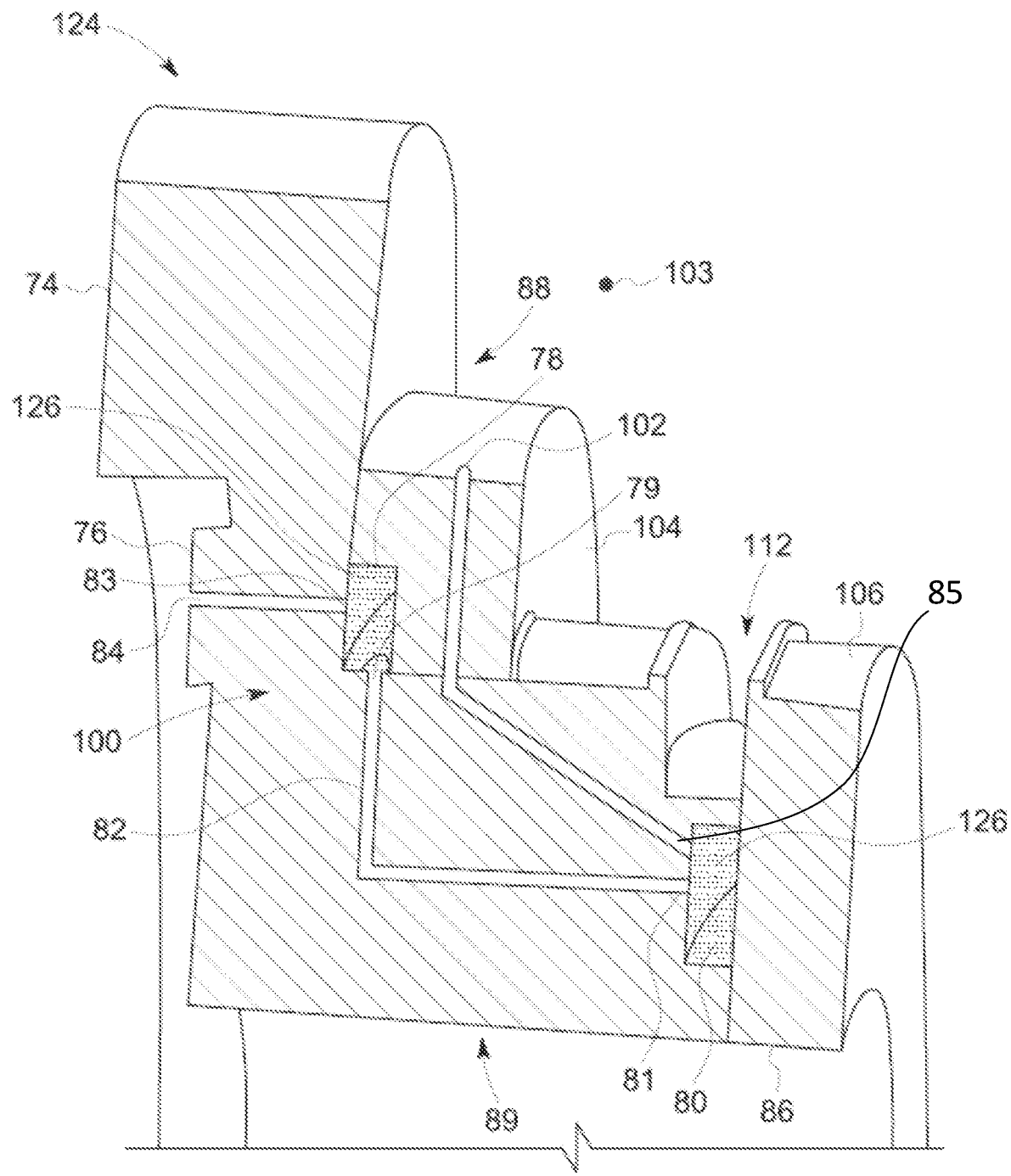
FIG. 5 is a schematic isometric sectional view of another embodiment of a face seal assembly, in accordance with one or more embodiments of the present disclosure.
Figure 6:
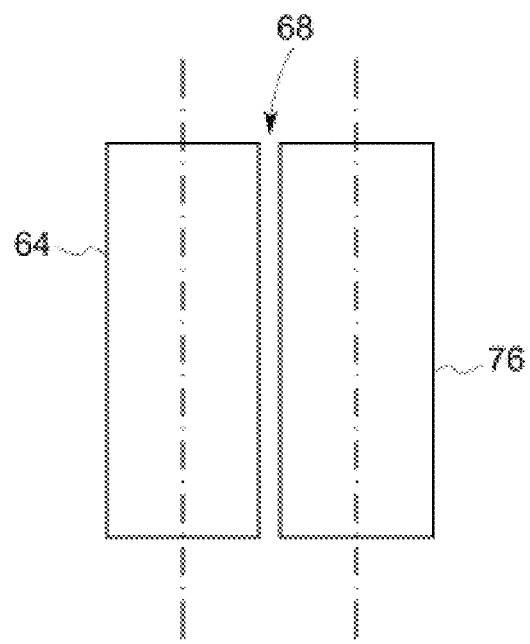
FIG. 6 is a schematic view illustrating the preferred alignment of a rotating component and a face seal assembly, in accordance with one or more embodiments of the present disclosure.

Referring now to FIG. 5, illustrated is yet another embodiment of a seal assembly, generally referenced 124. It should be noted that corresponding reference characters indicate corresponding parts to those of FIGS. 2 and 3. In the embodiment of FIG. 5, it is noted that a first internal cavity 78 and a second internal cavity 80 are included and positioned differently than previously described in FIGS. 2 and 3. In FIG. 5, the second internal cavity 80 is located in the projected end portion 86 of the seal ring 74. The location of the internal cavity or cavities 78, 80 may be optimized to provide more cooling in regions where high temperatures are expected, and thereby decreasing thermal distortion of the seal. Furthermore, in the embodiment of FIG. 5, the first internal cavity 78 and the second internal cavity 80 are filled, at least partially, with a porous material 126. In an embodiment, the porous material 126 may be any porous material, such as a wire mesh, sintered metal fibers, a metal matrix composite, a 3-D printed porous structure or the like, that imparts structure to the thermal cavities 78, 80.

Figure 7:
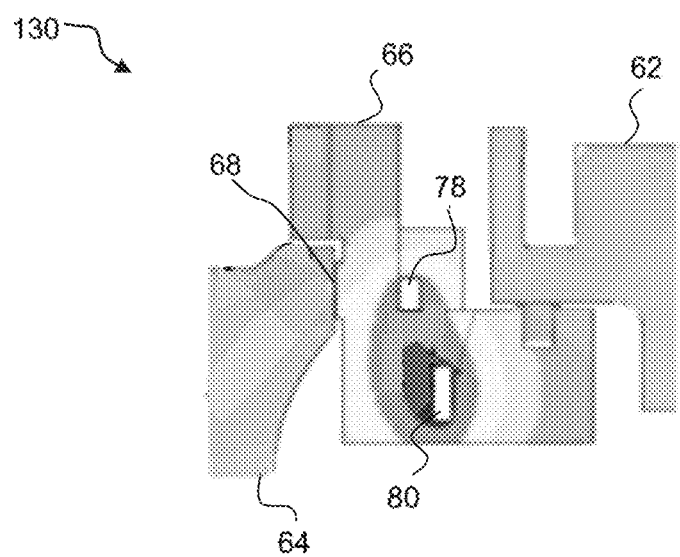
FIG. 7 is a schematic view illustrating temperature gradients in a face seal assembly, in accordance with one or more embodiments of the present disclosure.
Figure 8:
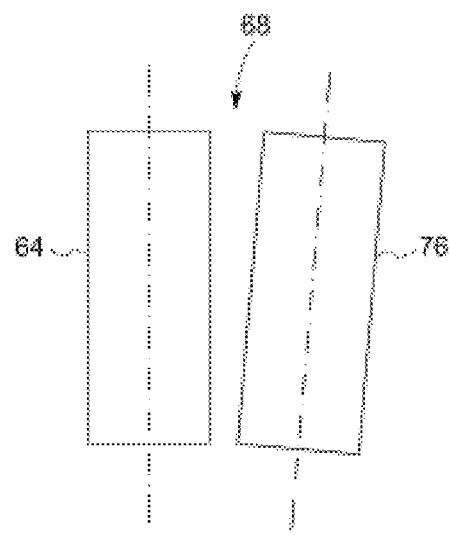
FIG. 8 is a schematic view illustrating the alignment of the rotating component and the face seal assembly of FIG. 7, in accordance with one or more embodiments of the present disclosure.

Referring now to FIGS. 6-10, the fluid 98 (FIG. 2) that traverses through the thermal hydrostatic fluid circuit 100 comprised of the thermal cavities and the fluid channel coupling the thermal cavities, effectively reduces temperature gradients in the seal assembly 66, thereby reducing the thermal distortion (coning) of the seal assembly 66. As the pressurized fluid 98 is routed through the thermal hydrostatic fluid circuit 100, extending in the circumferential direction 58, as well as in the axial direction 54, cooling of the seal assembly 66 is achieved. As best illustrated schematically in FIG. 6, in a desired film profile, the seal bearing face 76 of the seal ring 74, relative to the rotating component 64, remains substantially parallel in light of cooling of the seal ring 74 via the thermal hydrostatic fluid circuit 100. The thermal hydrostatic fluid circuit 100 is optimized to provide increased cooling in regions where higher temperatures are expected. Illustrated thermal gradients in FIG. 7, show an embodiment of a seal assembly 130, generally similar to seal assembly 66 of FIGS. 2 and 3, wherein a first internal cavity 78 and a second internal cavity 80 form a portion of the thermal hydrostatic fluid circuit 100. As illustrated, by managing an inlet flow temperature and location of the thermal cavities 78, 80, the seal assembly 66 remains cooler at the seal bearing face 76, resulting in less deformation (coning) of the seal assembly 130. As illustrated in FIG. 8, with the inclusion of the thermal cavities 78, 80 the temperature gradients within the seal assembly 130 are minimized, and thermal distortion is reduced. More specifically, as illustrated in FIG. 8, angular misalignment of the seal bearing face 76 of the seal ring 74, relative to the rotating component 64, is decreased allowing the seal bearing face 76 and the rotating component 64 to remain substantially parallel in light of cooling of the seal ring 74 via the thermal hydrostatic fluid circuit 100. Accordingly, the seal assembly 130 may be used at higher temperatures, speeds, an increased diameter and at smaller gaps.

Figure 9:
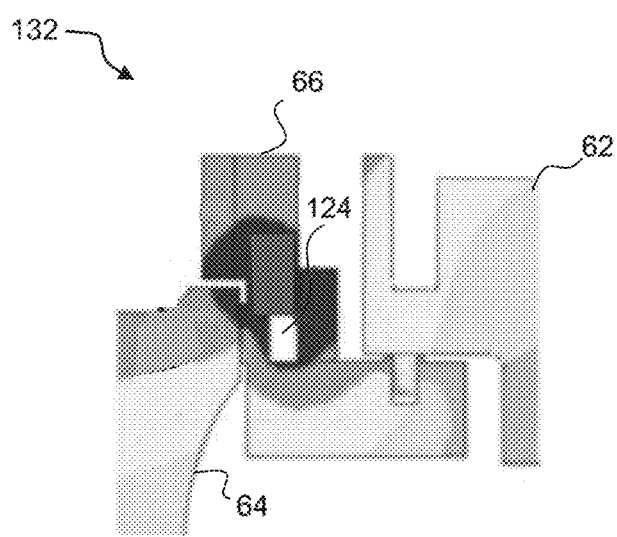
FIG. 9 is a schematic view illustrating temperature gradients in a face seal assembly, in accordance with one or more embodiments of the present disclosure.
Figure 10:
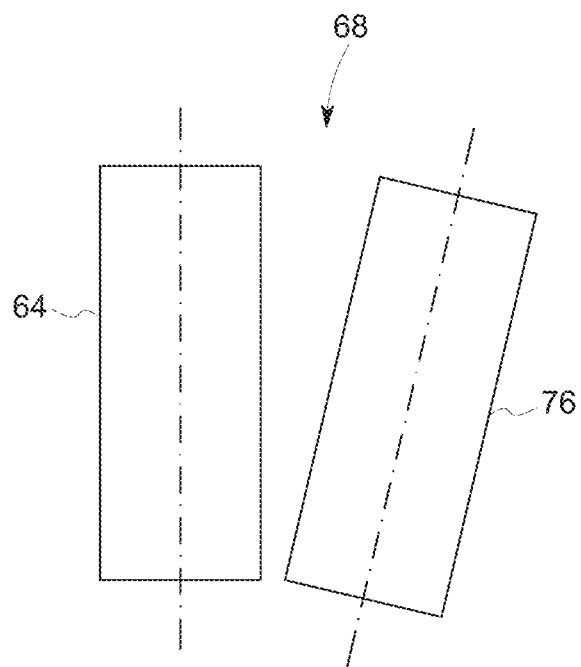
FIG. 10 is a schematic view illustrating the alignment of the rotating component and the face seal assembly of FIG. 9, in accordance with one or more embodiments of the present disclosure.

Illustrated thermal gradients in FIG. 9, illustrate an embodiment of a seal assembly 132, generally similar to seal assembly 120 of FIG. 4, wherein a single internal cavity 124 forms a portion of the hydrostatic fluid circuit 100. As illustrated, the single internal cavity 124 results in the seal assembly 132 becoming hotter at the seal bearing face 76, in contrast to the embodiment utilizing multiple thermal cavities. As a result, less deformation (coning) of the seal assembly 132 is achieved over a seal assembly that does not include a hydrostatic fluid circuit, but increased deformation (coning) is present over that of an embodiment that includes multiple thermal cavities, as previously described. As illustrated in FIG. 10, with the inclusion of only a single internal cavity 124, the temperature gradients within the seal assembly 132 are increased over an embodiment that utilizes multiple thermal cavities. More specifically, as illustrated in FIG. 10, in contrast to an embodiment including multiple thermal cavities, with the single internal cavity 124, the seal bearing face 76 of the seal ring 74, relative to the rotating component 64, does not remain substantially parallel in light of heating of the seal ring 74. Accordingly, use of the seal assembly 132 may be limited at high temperature, speed and diameter and at small gaps.

Advantageously, in accordance with one or more embodiments discussed herein, the inclusion of a thermal hydrostatic fluid circuit as disclosed herein, thermal distortion (coning) of the seal assembly is reduced at no extra leakage cost, thus permitting use of the seal assembly at higher temperatures, increased speeds and diameters, while also achieving small sealing gaps. Further in accordance with one or more embodiments discussed herein, reduced thermal distortion of the seal is achieved without reduced performance. The thermal hydrostatic fluid circuit disclosed herein allows aspirating face seals to be optimized in light of the integrally formed thermal management circuit. Further, the face seal assembly including the thermal management circuit decreases deformation of the sealing faces and angular misalignments relative to the rotating component. The face seal assembly may be operated with the seal ring or the rotating component having relatively larger diameters, thereby reducing the cost of machining sealing faces.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

While only certain features of embodiments have been illustrated and described herein, many modifications and changes will occur to those skilled in the art. It is, therefore, to be understood that the appended claims are intended to cover all such modifications and changes as falling within the spirit of the technique.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A face seal assembly comprising:
   a seal ring defining a radial direction and comprising:
      a seal bearing face;
      at least one internal cavity including a cavity inlet and a cavity outlet;
      a fluid inlet channel that has at least a portion extending in the radial direction such that a centerline of the portion extends in the radial direction and the portion is configured such that fluid therein flows in the radial direction, and that is in fluid communication with the cavity inlet of the at least one internal cavity and a pressurized fluid; and
      a fluid outlet port in fluid communication with the cavity outlet of the at least one internal cavity,
   wherein the at least one internal cavity, the fluid inlet channel, and the fluid outlet port define a thermal fluid circuit providing thermal management of the seal ring.

2. The assembly of claim 1,
   wherein the at least one internal cavity comprises:
      a first internal cavity, and
      at least one additional internal cavity,
   wherein a fluid channel fluidly couples the first internal cavity and the at least one additional internal cavity, and
   wherein the thermal fluid circuit is defined by the fluid inlet channel, the fluid outlet port, the first internal cavity, the at least one additional internal cavity, and the fluid channel.

3. The assembly of claim 1, wherein thermal management of the seal ring includes controlling thermal deformation of the seal ring.

4. The assembly of claim 1, further comprising at least one isolated hydrostatic port extending from the at least one internal cavity to the seal bearing face.

5. The assembly of claim 1, further comprising a porous material disposed in the at least one internal cavity.

6. The assembly of claim 5, wherein the porous material is at least one of a wire mesh, sintered metal fibers, a metal matrix composite, a 3-D printed porous structure.

7. The assembly of claim 1,
   wherein the seal ring further defines an axial direction, and
   wherein each of the at least one internal cavity is disposed entirely axially upstream of the fluid outlet port.

8. A face seal assembly comprising:
   a seal ring defining a radial direction and comprising:
      a seal bearing face;
      a first internal cavity including a cavity inlet and a cavity outlet;
      at least one additional internal cavity including a cavity inlet and a cavity outlet;
      a fluid channel extending from the first internal cavity to the at least one additional internal cavity;
      a fluid inlet channel that has at least a portion extending in the radial direction and that is in fluid communication with a pressurized fluid and the cavity inlet of one of the first internal cavity and the at least one additional internal cavity; and
      a fluid outlet port in fluid communication with the cavity outlet of the other of the first internal cavity and at least one additional internal cavity,
   wherein the first internal cavity, the at least one additional internal cavity, and the fluid channel define a fluid circuit providing thermal management of the seal ring.

9. The assembly of claim 8, wherein at least one additional internal cavity comprises a second internal cavity that is in fluid communication with the first internal cavity.

10. The assembly of claim 8, further comprising a pressurized fluid source coupled to one of the first internal cavity and the at least one additional internal cavity and configured to supply a pressurized fluid.

11. The assembly of claim 8, wherein the fluid outlet port further comprises a plurality of isolated hydrostatic ports extending from the cavity outlet of one of the first internal cavity and the at least one additional internal cavity to the seal bearing face.

12. The assembly of claim 11, wherein the plurality of isolated hydrostatic ports is disposed spaced apart from each along a circumferential direction of the seal bearing face.

13. The assembly of claim 8, further comprising a porous material disposed in at least one of the first internal cavity and the at least one additional internal cavity.

14. The assembly of claim 13, wherein the porous material is at least one of a wire mesh, sintered metal fibers, a metal matrix composite, a 3-D printed porous structure.

15. The assembly of claim 8,
wherein the seal ring further defines an axial direction, and
wherein each of the first internal cavity and the at least one additional internal cavity is disposed entirely axially upstream of the fluid outlet port.

16. A turbomachine comprising:
a stationary component;
a rotating component comprising a rotating component bearing face; and
a face seal assembly, the face seal assembly comprising:
a seal ring defining a radial direction and comprising:
a seal bearing face,
at least one internal cavity including a cavity inlet and a cavity outlet,
a fluid inlet channel that has at least a portion extending in the radial direction and that is in fluid communication with the cavity inlet of the at least one internal cavity and a pressurized fluid, and
a fluid outlet port in fluid communication with the cavity outlet of the at least one internal cavity,
wherein the at least one internal cavity, the fluid inlet channel, and the fluid outlet port define a thermal fluid circuit providing thermal management of the seal ring, and
wherein a first pressure cavity and a second pressure cavity are defined by the stationary component, the rotating component, and the face seal assembly.

17. The turbomachine of claim 16, further comprising a plurality of isolated hydrostatic ports extending from the at least one internal cavity to the seal bearing face and wherein the face seal assembly is slidably coupled to the stationary component and defines a face seal clearance between the rotating component bearing face and the seal bearing face.

18. The turbomachine of claim 17, wherein the plurality of isolated hydrostatic ports is disposed spaced apart from each along a circumferential direction of the turbomachine and at a central-line axis of the seal bearing face.

19. The turbomachine of claim 16,
wherein the at least one internal cavity comprises:
a first internal cavity, and
at least one additional internal cavity,
wherein a fluid channel extends from the first internal cavity to the at least one additional internal cavity, and
wherein the thermal fluid circuit is defined by the fluid inlet channel, the fluid outlet port, the first internal cavity, the at least one additional internal cavity, and the fluid channel.

20. The turbomachine of claim 16, wherein the second pressure cavity is disposed downstream of the first pressure cavity with reference to a flow of a process fluid along the stationary component and the rotating component.

21. The turbomachine of claim 16, further comprising:
a pressurized fluid supply source coupled to the at least one internal cavity and configured to supply a pressurized fluid to the at least one internal cavity.

22. The turbomachine of claim 16, further comprising a porous material disposed in the at least one internal cavity.

23. The turbomachine of claim 16,
wherein the seal ring further defines an axial direction, and
wherein each of the at least one internal cavity is disposed entirely axially upstream of the fluid outlet port.

* * * * *